UNITED STATES PATENT OFFICE.

HORACE FREEMAN, OF NIAGARA FALLS, ONTARIO, CANADA, ASSIGNOR TO AMERICAN CYANAMID COMPANY, OF NEW YORK, N. Y., A CORPORATION OF MAINE.

PROCESS OF PRODUCING ALKALI METALS FROM THEIR CHLORIDS.

1,319,148.      Specification of Letters Patent.      Patented Oct. 21, 1919.

No Drawing.     Application filed February 2, 1918. Serial No. 215,149.

*To all whom it may concern:*

Be it known that I, HORACE FREEMAN, a subject of the King of Great Britain, residing at Niagara Falls, in the Province of Ontario and Dominion of Canada, have invented certain new and useful Improvements in Processes of Producing Alkali Metals from Their Chlorids; and I do hereby declare the following to be a full, clear, and exact description of the invention, such as will enable others skilled in the art to which it appertains to make and use the same.

This invention relates to a process of producing alkali metals from their corresponding chlorids, especially metallic sodium from sodium chlorid, and has for its object to improve the procedures heretofore proposed.

With this and other objects in view, the invention consists in the novel steps and combinations of steps constituting the process, all as will be more fully hereinafter disclosed and particularly pointed out in the claims.

In carrying out this process for the making of metallic sodium, I may take, say, 80 parts, by weight, of commercial calcium carbid containing say 80% of the pure carbid, $CaC_2$, and 117 parts, by weight, of dry sodium chlorid, $NaCl$, and grind these materials together to form a finely divided mixture. This mixture may next be charged into any suitable furnace, preferably in rather shallow layers and heated to say a bright red temperature, and not higher than, say, 1400° C. As soon as the temperature of the sodium chlorid rises above its point of fusion, in the presence of calcium carbid, it is found that metallic sodium in the form of a vapor begins to be given off, and the reaction probably proceeds in two stages in accordance with the following equations:

(a)    $2NaCl + CaC_2 = CaCl_2 + Na2C_2$
(b)    $Na_2C_2 + heat = Na_2 + C_2$

That is to say, sodium carbid $Na_2C_2$ is probably first formed, and it being unstable at the temperatures employed, it immediately decomposes into metallic sodium and carbon. The metallic sodium being in the form of a vapor, is readily led out of the furnace and recovered by any suitable means. The carbon is left behind in the furnace mixed with the calcium chlorid formed and this mixture may be used for certain purposes, or the calcium chlorid, $CaCl_2$ may be extracted with water.

The reaction, in practice, is found to proceed to a desirable yield, and when the temperature approaches say 1200° C. or 1300° C. this yield is very high indeed.

In making other alkali metals from their chlorids, the process is the same. Potassium chlorid, $KCl$, for example, may be substituted for sodium chlorid in the above equation and the metallic potassium recovered in the same manner.

Of course, it is understood that the materials may be premixed as above disclosed, or they may be introduced in the furnace separately. The sodium chlorid may be first fused, and the calcium carbid added, or the calcium carbid may be first heated and the sodium chlorid added.

It is therefore obvious that those skilled in the art may vary the details of the process without departing from the spirit of the invention, and accordingly, I do not wish to be limited to the above disclosure except as may be required by the claims.

What I claim is:—

1. The process of producing metallic sodium from a finely divided mixture of sodium chlorid and calcium carbid which consists in subjecting said mixture to a temperature above the fusing point of said chlorid to form calcium chlorid, metallic sodium and carbon; and recovering said metallic sodium, substantially as described.

2. The process of producing metallic sodium from sodium chlorid and commercial calcium carbid, which consists in providing a finely divided mixture containing substantially 117 parts by weight of sodium chlorid to substantially 80 parts by weight of said carbid, and heating the mixture to a temperature above 800° C. to drive off the desired metallic sodium in the form of a vapor, substantially as described.

In testimony whereof I affix my signature, in presence of two witnesses.

HORACE FREEMAN.

Witnesses:
LORA S. AVERY,
WALTER D. NIXON.